United States Patent
Lincoln et al.

(10) Patent No.: US 11,311,827 B1
(45) Date of Patent: Apr. 26, 2022

(54) WATER FILTER SYSTEM HEAD WITH INTERCHANGEABLE INLET AND OUTLET CONNECTIONS

(71) Applicant: ERD Paris, LLC, Atlanta, GA (US)

(72) Inventors: Danny F. Lincoln, Commerce, GA (US); Ehud Levy, Santa Rosa Beach, FL (US)

(73) Assignee: ERD Paris, LLC, Middletown, DE (US)

( * ) Notice: Subject to any disclaimer, the term of this patent is extended or adjusted under 35 U.S.C. 154(b) by 0 days.

(21) Appl. No.: 17/566,815

(22) Filed: Dec. 31, 2021

(51) Int. Cl.
*B01D 35/157* (2006.01)
*C02F 1/00* (2006.01)
*B01D 35/147* (2006.01)
*B01D 29/66* (2006.01)
*B01D 35/15* (2006.01)

(52) U.S. Cl.
CPC ......... *B01D 35/1573* (2013.01); *B01D 29/66* (2013.01); *B01D 35/147* (2013.01); *B01D 35/15* (2013.01); *C02F 1/001* (2013.01); *B01D 2201/165* (2013.01); *B01D 2201/29* (2013.01); *C02F 2201/004* (2013.01); *C02F 2201/005* (2013.01); *C02F 2201/006* (2013.01); *C02F 2303/16* (2013.01)

(58) Field of Classification Search
CPC .. B01D 35/1573; B01D 29/66; B01D 35/147; B01D 35/15; B01D 2201/165; B01D 2201/29; C02F 1/001; C02F 2201/004; C02F 2201/005; C02F 2201/006; C02F 2303/16
See application file for complete search history.

(56) References Cited

U.S. PATENT DOCUMENTS

| | | | |
|---|---|---|---|
| 2,948,398 A | 8/1960 | Engholdt | |
| 3,513,981 A | 5/1970 | Mendelow | |
| 3,985,652 A * | 10/1976 | Cooper | B01D 35/15 210/167.02 |
| 5,096,721 A | 3/1992 | Levy | |
| 5,133,871 A | 7/1992 | Levy | |
| 5,174,337 A | 12/1992 | Dahlen et al. | |
| 5,192,571 A | 3/1993 | Levy | |

(Continued)

FOREIGN PATENT DOCUMENTS

WO WO2000072939 A1 7/2000

*Primary Examiner* — Terry K Cecil
(74) *Attorney, Agent, or Firm* — Mitch Harris, Atty at Law, LLC; Andrew M. Harris

(57) ABSTRACT

A water filtration system and water filtration system head provide interchangeable water inlet and outlet ports, so that a direction of a flow of water through the water filtration system can be reversed by configuring a valve provided in the water filtration system head that attaches to a cartridge housing containing a water filter cartridge. The head has a first fluid channel communicating with a fluid volume between the cartridge housing and the outer surface of a water filter cartridge, a second fluid channel in communication with an inside of the cartridge, and a multi-position valve that either conducts inlet water from a first port to the first fluid channel and conducts outlet water from the second fluid channel to the second port, or conducts inlet water from the second port to the first fluid channel and conducts outlet water from the second fluid channel to the first port.

20 Claims, 10 Drawing Sheets

(56) References Cited

U.S. PATENT DOCUMENTS

| | | |
|---|---|---|
| 5,401,416 A | 3/1995 | Levy |
| 5,538,746 A | 7/1996 | Levy |
| 5,562,941 A | 10/1996 | Levy |
| 5,612,522 A | 3/1997 | Levy |
| 5,616,243 A | 4/1997 | Levy |
| 6,241,893 B1 | 6/2001 | Levy |
| 7,229,552 B1 | 6/2007 | Levy |
| 7,264,726 B1 | 9/2007 | Levy |
| 7,357,868 B2 | 4/2008 | Levy |
| 7,407,148 B2 | 8/2008 | Bassett et al. |
| 7,429,326 B2 | 9/2008 | Levy |
| 7,662,278 B2 | 2/2010 | Brooks et al. |
| 7,673,756 B2 | 3/2010 | Levy et al. |
| 8,277,654 B2 | 10/2012 | Levy |
| 8,501,005 B2 | 8/2013 | Levy |
| 8,701,895 B2 | 4/2014 | Levy |
| 8,702,990 B2 | 4/2014 | Levy |
| 9,409,794 B2 | 8/2016 | Wawlra et al. |
| 9,782,706 B1 | 10/2017 | Levy |
| 10,112,859 B2 | 10/2018 | Levy |
| 10,456,723 B2 | 10/2019 | Levy |
| 10,464,820 B2 | 11/2019 | Levy |
| 10,519,046 B2 | 12/2019 | Levy |
| 2008/0000820 A1 | 3/2008 | Mitchell |
| 2018/0099878 A1 | 4/2018 | Levy |

* cited by examiner

WATER FILTER SYSTEM HEAD WITH INTERCHANGEABLE INLET AND OUTLET CONNECTIONS

BACKGROUND

1. Field of Disclosure

The field of representative embodiments of this disclosure relates generally to water filtration systems, and in particular, to a water filter system head that allows for interchange of inlet and outlet connections in a water filter system installation without requiring disconnection and reversal of inlet and outlet ports of the water filter system head.

2. Description of the Related Art

Water filtration is required in many industrial and residential applications to remove particles such as metals, organisms and organic molecules from available water sources. Multiple stages of filtration may be cascaded to improve filtration, typically filter a decreasing particle size as the water proceeds through the stages. Filter elements include replaceable paper, plastic and activated carbon cartridges elements, including cartridges that combine more than one type of element.

Typical water filter units receive an input water source and deliver the input water to the outside surface of a cylindrical cartridge. Output water is received from a central void in the cartridge, which retains particles as the water passes through the wall of the cartridge. The inlet ports and outlet ports are connected via waters to the surfaces of the cylindrical cartridge in a fixed configuration. The water filter housing typically consists of a water filtration system head that is mounted to a mounting surface by a flange and a cartridge housing that holds the cylindrical cartridge, and which is removable for replacement of the cartridge. However, such a water filtration system must typically be installed with a plumbing flow direction that proceeds from left-to-right or from right-to-left (when facing the mounting surface), depending on the manufacture of the water filtration system head, leading to incompatibilities between water filtration system installations of different designs.

Therefore, it would be desirable to provide a water filtration system that may be installed in either a right-to-left configuration or a left-to-right configuration without requiring modification of the system plumbing.

SUMMARY

The above objectives, among others, are achieved in a water filtration system having a water filter head with interchangeable inlet and outlet connections, a water filtration system and their methods of operation.

The water filtration system includes a water filter cartridge defining an internal cylindrical void and a cartridge housing that has an inner wall defining a substantially cylindrical void for receiving the water filter cartridge, so that the water filter cartridge has a longitudinal axis aligned with the central axis of the substantially cylindrical void of the cartridge housing, and a bottom wall supporting a bottom end of the water filter cartridge. The water filtration system also includes a water filtration system head with at least one first port accessible on an external surface of the water filtration system head for connection to an external plumbing water system and at least one second port accessible on the external surface of the water filtration system head for connection to the plumbing system. The water filtration system head has a first fluid channel in fluid communication with a fluid volume disposed between the between an inner wall of the cartridge housing and an outer surface of the water filter cartridge, a second fluid channel in fluid communication with the internal cylindrical void of the water filter cartridge, and a multi-position valve that in at least one first position, conducts inlet water from the at least one first port to the first fluid channel and conducts outlet water from the second fluid channel to the at least one second port, and that in at least one second position, conducts inlet water from the at least one second port to the first fluid channel and conducts outlet water from the second fluid channel to the at least one first port, whereby inlet and outlet connections to the external plumbing system are capable of interchange by adjusting the multi-position valve between the at least one first position and the at least one second position. The cartridge has mating features located at a top end of the cartridge housing for mating with corresponding mating features provided on the water filtration system head.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure illustrates water filtration systems that have interchangeable inlet and outlet ports through the use of a configurable valve that is incorporated into the water filtration system head, so that a direction of a flow of water through the water filtration system can be reversed by configuring the valve. The head has a first fluid channel communicating with a fluid volume between the between the cartridge housing and the outer surface of a water filter cartridge, a second fluid channel in communication with an inside of the cartridge, and a multi-position valve that either conducts inlet water from a first port to the first fluid channel and conducts outlet water from the second fluid channel to the second port, or conducts inlet water from the second port to the first fluid channel and conducts outlet water from the second fluid channel to the first port. Additionally, the multi-position valve may include one or more flush positions to flush an initial debris stream from the inside of the cartridge by conducting inlet water to the second fluid channel and conducing outlet water to a flush port exit on the water filtration system head, and one or more bypass positions to directly couple the inlet port to the outlet port, bypassing the cartridge for removal and replacement. A stop may be provided to prevent the valve from being rotated to interchange the inlet and outlet ports (and to prevent selection of an incorrect flush configuration), once the flow direction of the system has been configured.

Figure 1:
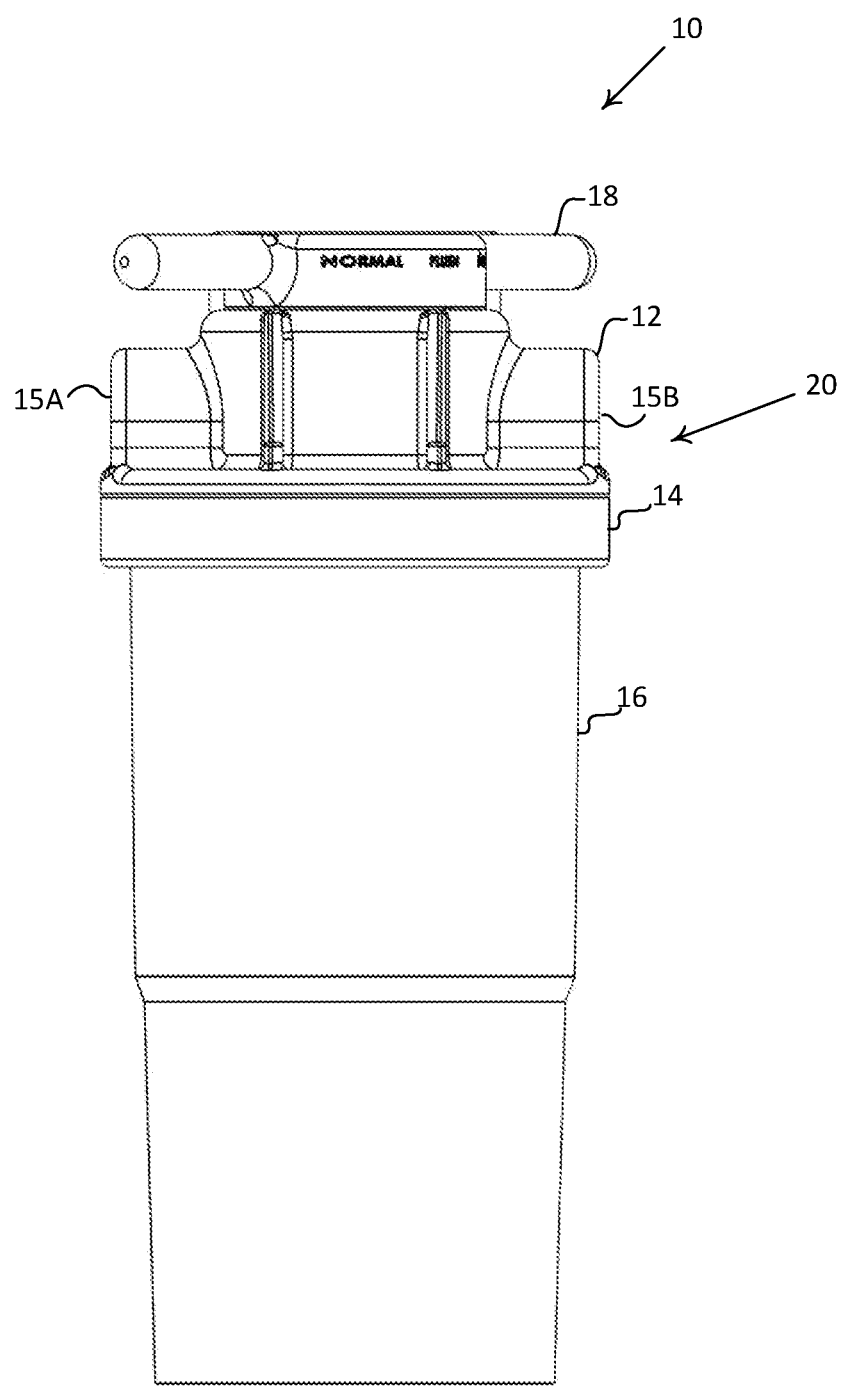
FIG. 1 is a front view of an example water filtration system 10, in accordance with an embodiment of the disclosure.

Referring now to FIG. 1, a front view of an example water filtration system 10 is shown. Example water filtration system 10 includes a water filtration system head 20 including a frame 12, a rotatable valve body 14, and a handle 18 that implement a valve as will be described in further detail below. Frame 12 provides a water inlet/outlet 15A, a water inlet/outlet 15B, which can be interchanged in function, i.e., inlet or outlet, by removing handle 18 and rotatable valve body 14 by 180 degrees in the plane extending from the figure. A water filter cartridge housing 16 secures a cartridge (not shown) to water filtration system head 20.

Figure 2A:
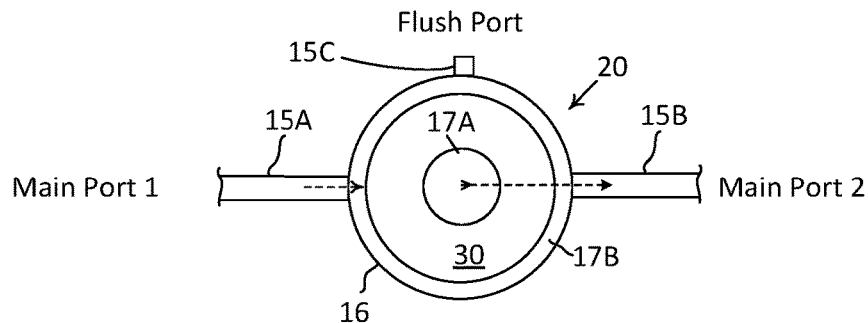
FIGS. 2A-2D are schematic diagrams illustrating operation of a valve incorporated in an example water filtration system head 20 of example water filtration system 10 of FIG. 1, in accordance with an embodiment of the disclosure.
Figure 2B:
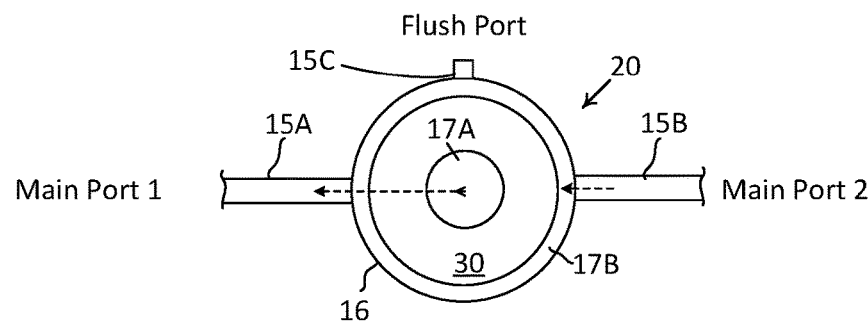

Referring now to FIGS. 2A-2D, operation of water filtration system head 20 is illustrated, in accordance with an embodiment of the disclosure. In general, there are six operating modes of the valve implemented by water filtration system head 20, corresponding to six positions of handle 18. FIG. 2A illustrates a first normal operating position of the valve, in which inlet water is provided to water inlet/outlet 15A, which in the illustrated operating mode, serves as a water inlet in the depicted operating mode. Outlet filtered water is provided from water inlet/outlet 15B, which serves as a filtered water outlet in the depicted operating mode. A flush port 15C, which will be described in further detail below, is blocked. In the operating mode illustrated in FIG. 2A, inlet water received from water inlet/outlet 15A is directed to a water volume between an inner wall of water filter cartridge housing 16 and a water filter cartridge 30. Outlet water is received by water inlet/outlet 15B from a water volume within in a central cylindrical void 17A of water filter cartridge 30. FIG. 2B illustrates a second normal operating position of the valve, in which inlet water is provided to water inlet/outlet 15B, which in the illustrated operating mode, serves as a water inlet in the depicted operating mode. Outlet filtered water is provided from water inlet/outlet 15A, which serves as a filtered water outlet in the depicted operating mode. Flush port 15C is blocked. In the operating mode illustrated in FIG. 2B, inlet water received from water inlet/outlet 15B is directed to the water volume between the inner wall of water filter cartridge housing 16 and water filter cartridge 30. Outlet water is received by water inlet/outlet 15A from the water volume within central cylindrical void 17A of water filter cartridge 30. As illustrated, reconfiguring water system head 20 between the first normal operating mode illustrated in FIG. 2A and the second operating mode illustrated in FIG. 2B accomplishes an interchange of flow direction between a right-to-left flow configuration, e.g., FIG. 2A and a left-to-right flow configuration, e.g., FIG. 2B, however the depicted embodiment is not a limitation of the present disclosure, and with suitable provision of water channels within water filtration system head 20, other locations of water inlet/outlet 15A and water inlet/outlet 15B may be implemented while maintaining reversal of flow direction with respect to external plumbing connected to water inlet/outlet 15A and water inlet/outlet 15B.

Figure 2C:
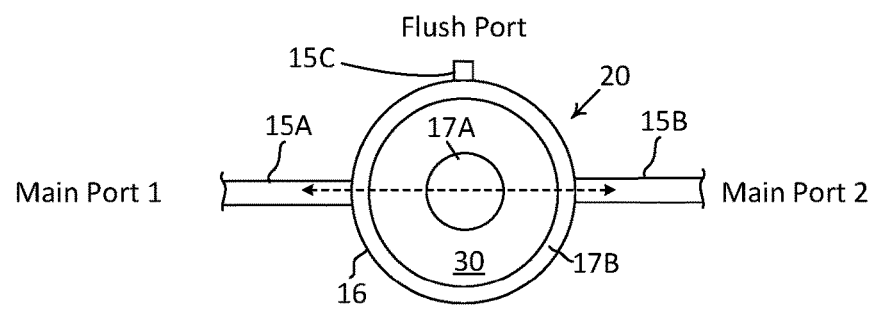

FIG. 2C illustrates a bypass mode of operation, which may be used when replacing water filter cartridge 30. In FIG. 2C, inlet water received at a first one of water inlet/outlet 15A and water inlet/outlet 15B is exchanged with outlet water provided from water inlet/outlet 15A and water inlet/outlet 15B. In the embodiments illustrated with further detail below, there are two bypass modes of operation, corresponding to a rotation of the valve implemented by water filtration system head 20 by 180 degrees in the plane extending from FIG. 1. Since both bypass modes of operation connect water inlet/outlet 15A and water inlet/outlet 15B, FIG. 2C corresponds to both bypass modes. In some embodiments, two bypass modes may not be implemented, as a single bypass mode that connects water inlet/outlet 15A and water inlet/outlet 15B may suffice to bypass water filter cartridge 30, without otherwise affecting operation of water filtration system 10.

Figure 2D:
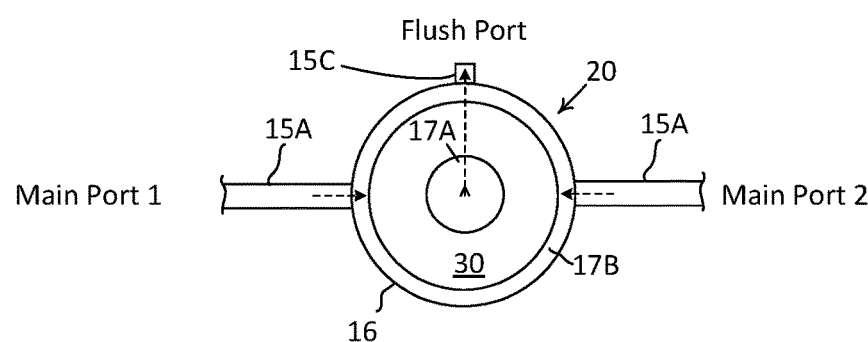

FIG. 2D illustrates a flush mode of operation, which may be used after installing a new water filter cartridge 30 to flush debris, e.g., carbon filter particles, from central cylindrical void 17A of water filter cartridge 30. In FIG. 2D, inlet water received at either of water inlet/outlet 15A and water inlet/outlet 15B is directed to the water volume between the inner wall of water filter cartridge housing 16 and water filter cartridge 30. Outlet water from the water volume within in central cylindrical void 17A of water filter cartridge 30 is directed to flush port 15C, where debris-laden water exits water filtration system head 20. In the embodiments illustrated with further detail below, there are two flush modes of operation, corresponding to a rotation of the valve implemented by water filtration system head 20 by 180 degrees in the plane extending from FIG. 1. Since both flush modes of operation connect water inlet/outlet 15A and water inlet/outlet 15B the water volume between the inner wall of water filter cartridge housing 16 and water filter cartridge 30, FIG. 2D corresponds to both flush modes. In some embodiments, two bypass modes may not be implemented, as a single flush mode that connects water inlet/outlet 15A and water inlet/outlet 15B may suffice to flush central cylindrical void 17A of water filter cartridge 30, without otherwise affecting operation of water filtration system 10. Alternatively, the inlet water for a first flush mode that corresponds to the first normal operating mode may receive inlet water only from water inlet/outlet 15A and water inlet/outlet 15B may be blocked, which will isolate the outlet water from water inlet/outlet 15B during a flush operation. Similarly, a second flush mode that corresponds to the second normal operating mode may receive inlet water only from water inlet/outlet 15B and water inlet/outlet 15A may be blocked, which will isolate the outlet water from water inlet/outlet 15A during a flush operation.

Figure 3:
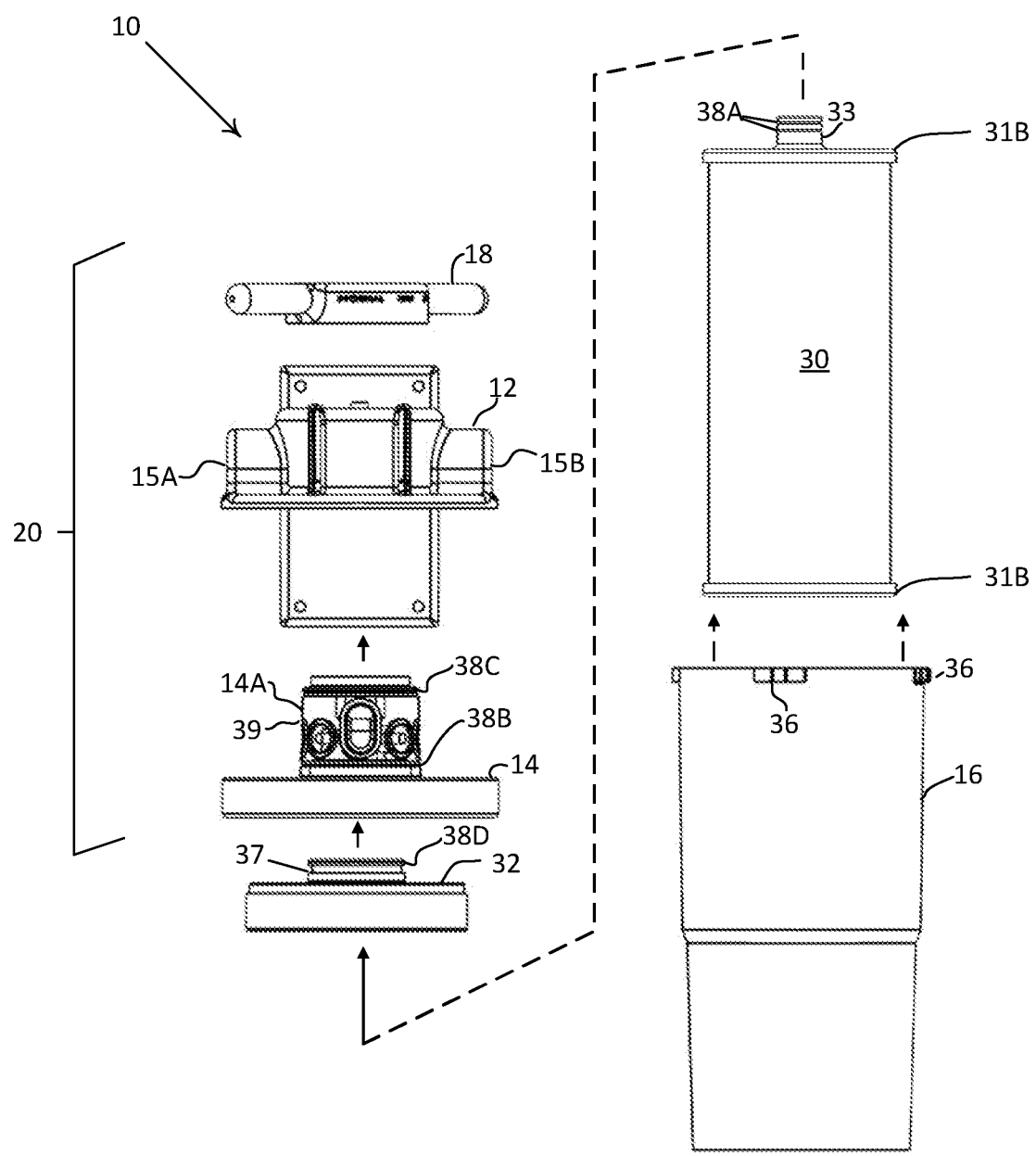
FIG. 3 is an exploded front view of example water filtration system head 20, in accordance with an embodiment of the disclosure.

Referring now to FIG. 3, an exploded view of example water filtration system 10 is shown. Inlet and outlet water are coupled to water filter cartridge 30 through water filtration system head 20 formed by frame 12, rotatable valve body 14 and handle 18. Water filtration system head 20 couples water to and from water filter cartridge 30, with filtered water received from central cylindrical void 17A coupled through a fitting 37 of a cap 32 that acts as a top spacer disc and includes one or more O-ring seals 38D. A fitting 33 of water filter cartridge 30 that couples water from central cylindrical void 17A passes through fitting 37 to connect to an inner receptacle provided on a bottom of rotatable valve body 14 and is sealed by O-rings 38A. Fitting 33 thus provides outlet water to a selected one of inlet/outlet port 15A, inlet/outlet port 15B, or flush port 15C, depending on the selected operating mode of the valve. Fitting 37 engages with an outer receptacle provided on a bottom side of rotatable valve body 14 to receive inlet water from the other one of inlet/outlet port 15A, inlet/outlet port 15B to conduct inlet water to the water volume between the inner wall of cartridge housing 16 and the outer wall of water filter cartridge 30. Cartridge housing 16 encloses water filter cartridge 30 and locks to a bottom of rotatable valve body 14 via a plurality of locking tabs 36, which provide a twist-lock operation. In the depicted embodiment, rotation of rotatable valve body 14 rotates cartridge housing 16, but in other embodiments, cartridge housing may be fixed with respect to water filtration system head 20. Rotatable valve body 14 has a cylindrical portion 14A that is fitted to and rotates within an inner void of frame 12. The connection between cylindrical portion 14A of rotatable valve body 14 is sealed with O-rings 38B and 38C at a top and bottom end of cylindrical portion 14A. A plurality of O-rings 39 also provides sealing with various apertures terminating internal water channels of cylindrical portion 14A that direct water according to a rotation of rotatable valve body by handle 18, to select the various operating modes of water filtration system head 20. Handle 18 secures rotatable valve body 14 to frame 12.

Figure 4A:
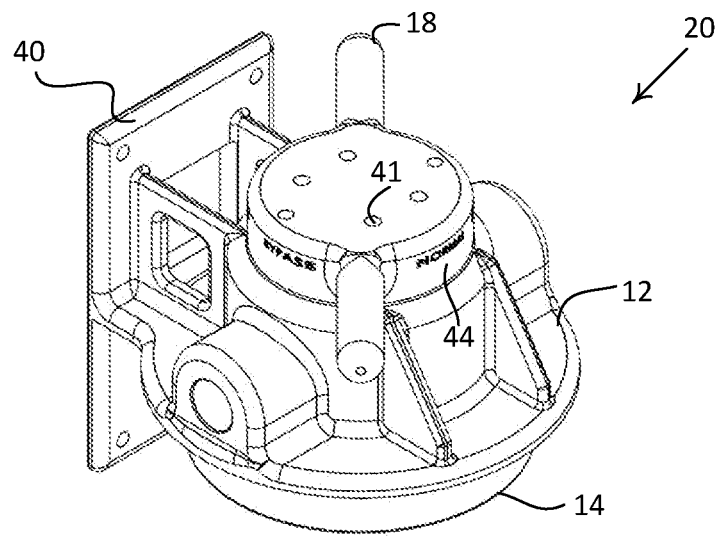
FIG. 4A is a perspective view of example water filtration system head 20.
Figure 4B:
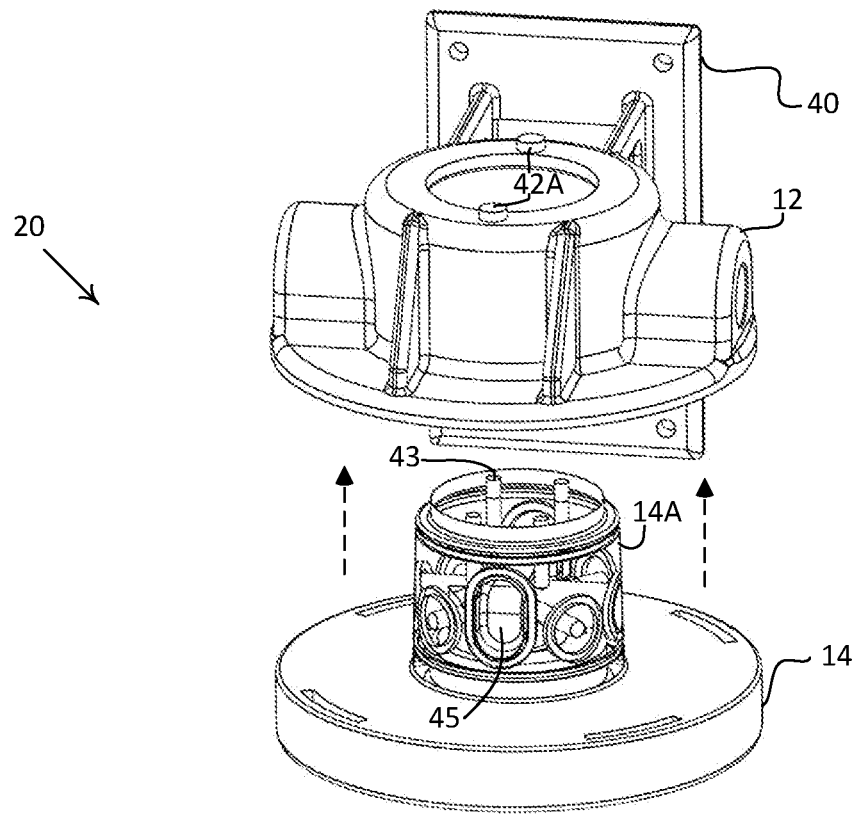
FIG. 4B is an exploded perspective view of example water filtration system head 20 with handle 18 removed, in accordance with an embodiment of the disclosure.

Referring now to FIG. 4A, a perspective view of example water filtration system head 20, and to FIG. 4B, an exploded perspective view of example water filtration system head 20 with handle 18 removed, are shown with an embodiment of the disclosure. A plurality of fasteners 41, e.g., screws or machine bolts, secures handle 18 to a top side of rotatable valve body 14 and thereby secures rotatable valve body 14 to frame 12, which provides a mounting flange 40 for securing water filtration system 10 to a wall, frame, or other mounting location. Rotation of handle to a position substantially beyond three operational modes for each of either a right-to-left or left-to-right configuration, is prevented by a plurality of stops 42A that engage with channels formed on a bottom of handle 18. Textual markings 44 showing the proper alignment of rotatable valve body 14 for the various operating modes are molded into the plastic forming handle 18. A plurality of posts 43 receive fasteners 41 and include either voids for receiving screws or threaded inserts for receiving machine bolts, provides for attachment of handle 18 to a top of cylindrical portion 14A of rotatable valve body 14. Apertures 45 align with apertures in frame 12 at various positions, in order to conduct water flow as illustrated in FIGS. 2A-2D, as described above.

Figure 5A:
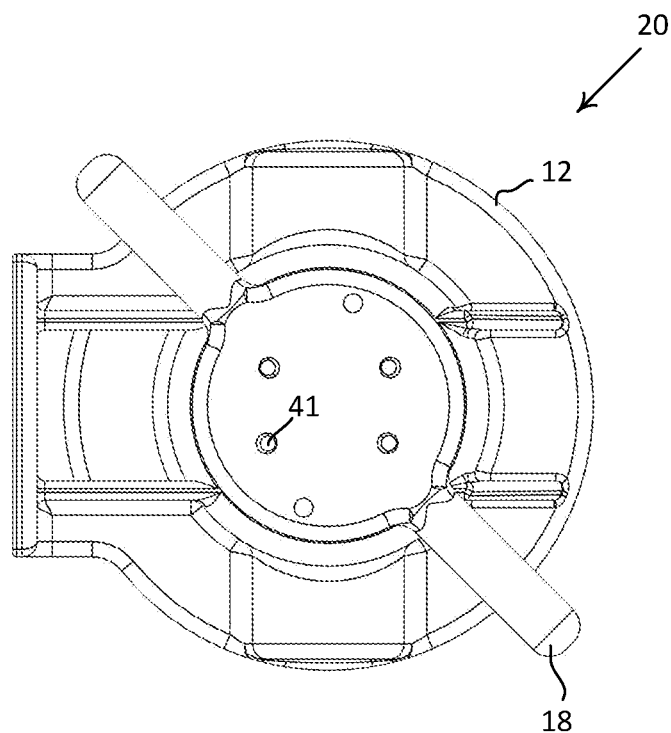
FIG. 5A is a top view of example water filtration system head 20, in accordance with an embodiment of the disclosure.
Figure 5B:
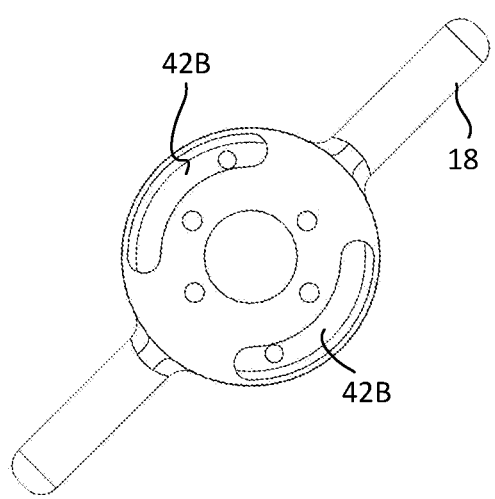
FIG. 5B is a bottom view of handle 18, in accordance with an embodiment of the disclosure.

Referring now to FIG. 5A, a top view of example water filtration system head 20 is shown, in accordance with an embodiment of the disclosure. A location of fasteners 41 is illustrated at a top side of handle 18. Referring now to FIG. 5B, a bottom view of handle 18 is shown, in accordance with an embodiment of the disclosure. Channels 42B are sized to accept stops 42A of frame 12 (illustrated with dashed lines) as described above and to permit rotation of handle 18 (and thereby rotatable valve body 14) through three positions corresponding to the three operating modes (normal, flush and bypass) for the selected configuration, which, in the illustrated embodiment is a rotation of approximately 100 degrees. As illustrated, handle 18 is near the endstop of counter-clockwise rotation with respect to a top side of handle 18. When handle 18 is removed from rotatable valve body 14 and rotated by 180 degrees, the approximate endpoints of rotation of handle 18 are reversed, i.e., stops 42A on frame 12 would then be located such that handle 18 would be near the endstop of clockwise rotation. Thus, there is a small overlap, e.g., 5 degrees of the rotation of handle 18 at each end of the rotation range in the two different configurations of water filter system 10 (e.g., left-to-right or right-to-left). However, the alignment of textual markings 44 with the front of housing 12 gives the proper alignment for selection of the various operating modes, which will be, for example, 10 degrees from the endpoints of rotation and the middle of the range of rotation.

Figure 6A:
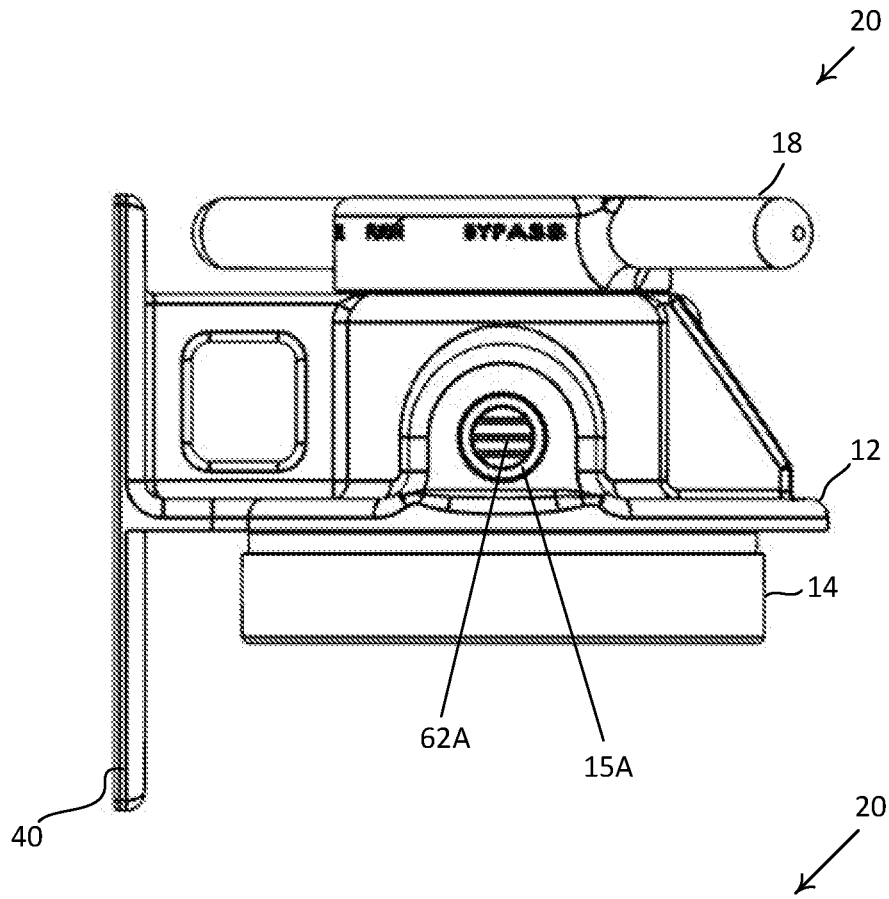
FIG. 6A left side view and FIG. 6B is a right side view of example water filtration system head 20, in accordance with an embodiment of the disclosure.
Figure 6B:
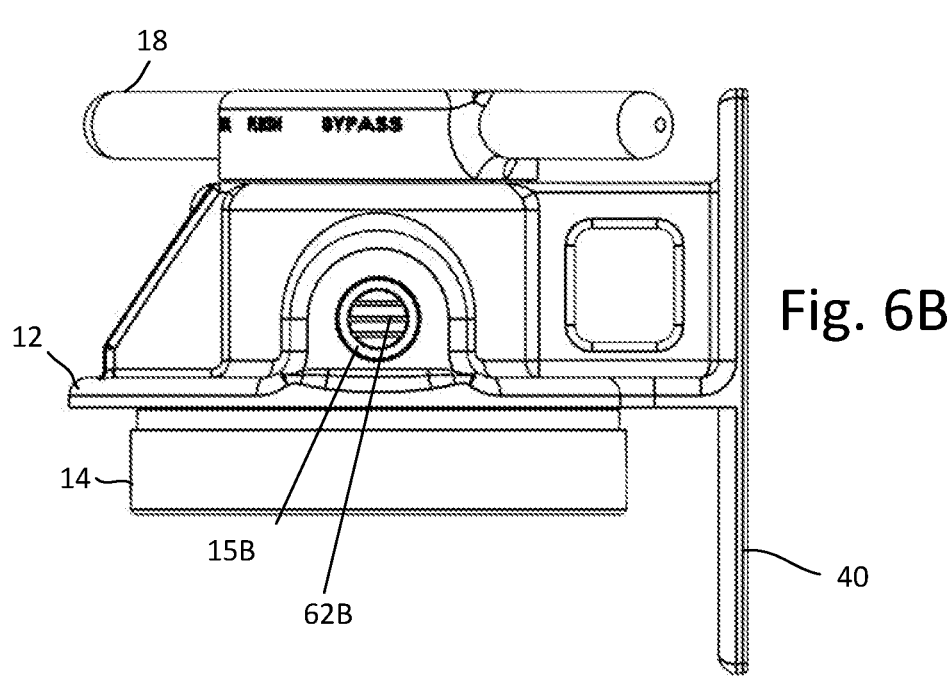

FIG. 6A shows a left side view and FIG. 6B shows a right side view of example water filtration system head 20, in accordance with an embodiment of the disclosure. The location of inlet/outlet port 15A is shown in FIG. 6A and the location of inlet/outlet port 15B is shown in FIG. 6B. A plurality of vanes 62A, 62B are included in inlet/outlet ports 15A, 15B, respectively, which secure O-rings 39 (FIG. 3) from projecting into inlet/outlet ports 15A, 15B when rotatable valve body 14, preventing mis-operation of water filtration system 10 and/or possible damage to O-rings 39. The location and profile of mounting flange 40 is also illustrated.

Figure 7A:
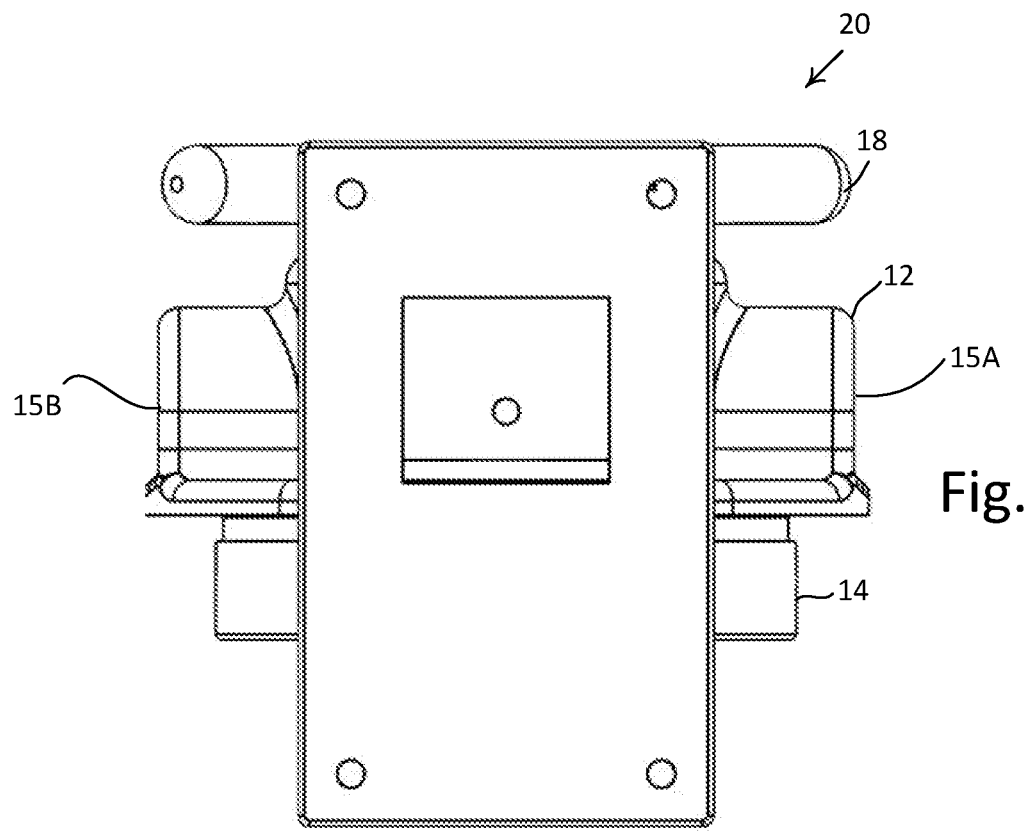
FIG. 7A is a rear view and FIG. 7B is a bottom view of example water filtration system head 20, in accordance with an embodiment of the disclosure.
Figure 7B:
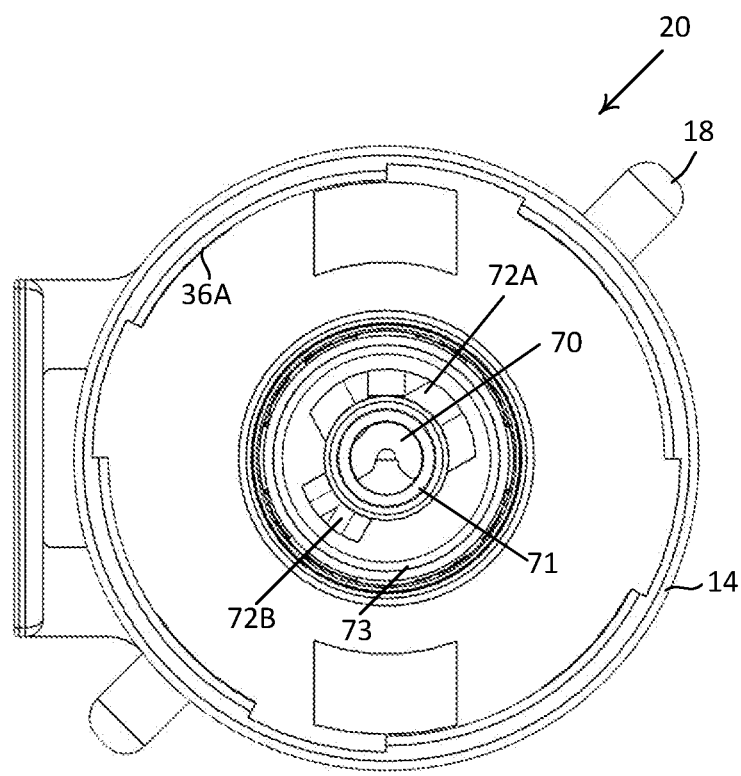

FIG. 7A shows a rear view and FIG. 7B shows a bottom view of example water filtration system head 20, in accordance with an embodiment of the disclosure. FIG. 7A shows a location of flush port 15C, which in the depicted embodiment is a hole provided through frame 12 to an internal flush water channel within frame 12. FIG. 7B shows a location of inner receptacle 71 that receives fitting 33 of water filter cartridge 30, and couples water from central cylindrical void 17A through a first water channel 70 to either the selected inlet one of inlet/outlet ports 15A, 15B or to flush port 15C, according to the selected operating mode and configuration of water filter system 10. FIG. 7B also shows a location of outer receptacle 73, through which inlet water flows to one or both of second water channels 72A, 72B, depending on the selected operating mode and configuration.

Figure 8A:
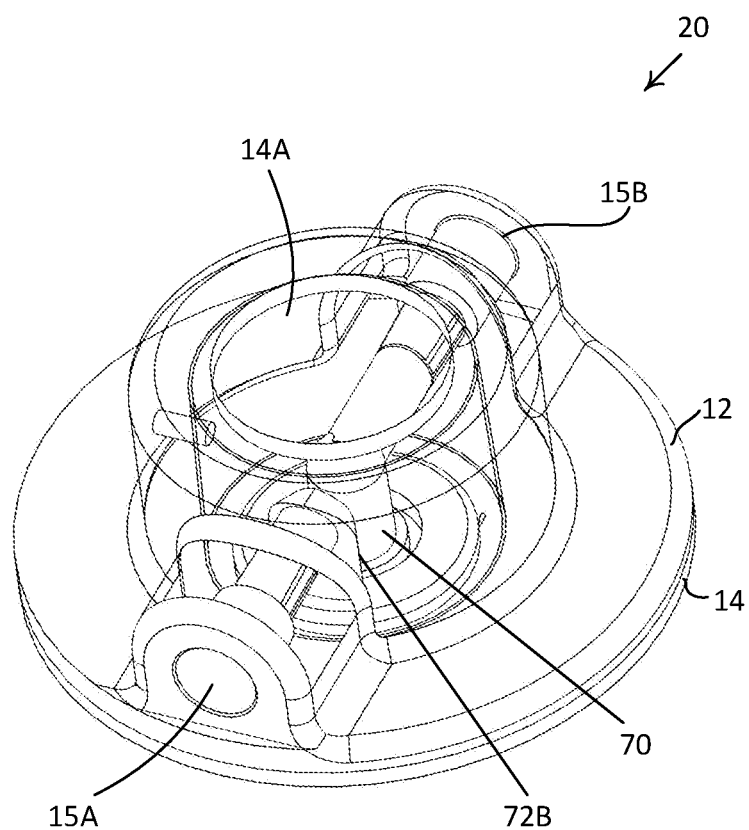
FIG. 8A is a top perspective view.
Figure 8B:
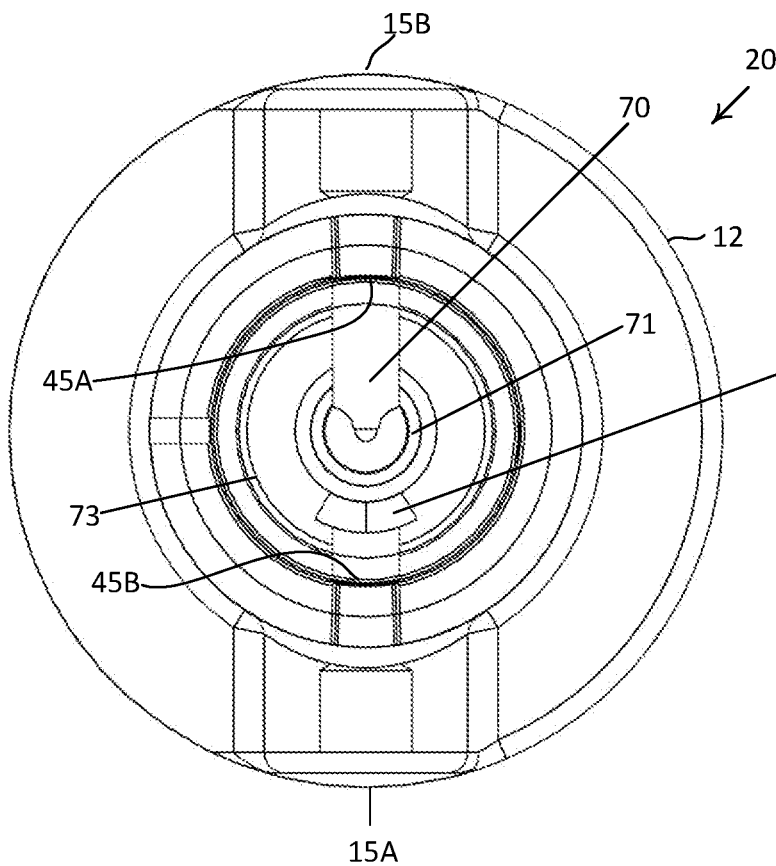
FIG. 8B is a top view, illustrating internal features of example water filtration system head 20 in a normal flow mode, in accordance with an embodiment of the disclosure.

Due to the complexity of the water channels within rotatable valve body 14, water channels for the three operating modes described above, are shown separately. FIG. 8A shows a top perspective view, and FIG. 8B shows a top view, of water filtration system head 20 in a normal flow mode, in accordance with an embodiment of the disclosure. The illustrated views show a right-to-left flow configuration with reference to the directions in FIG. 1 and in the above description of the figures generally, as selected by the rotational position of rotatable valve body 14 with respect to frame 12. A separate view is not provided for the left-to-right flow configuration, but is easily seen that rotation of rotatable valve body 14 with respect to frame 12 by an angle of 180 degrees, will reverse the connections to inlet/outlet port 15A and inlet/outlet port 15B. In the depicted configuration and mode, first water channel 70 extends from inner receptacle 71 to an aperture 45A that connects first water channel 70, and thus the water volume of the central void of water filter cartridge 30, to inlet/outlet port 15B. Second water channel 72B extends from outer receptacle 73 to another aperture 45B that connects second water channel 72B, and thus the water volume between the inner wall of cartridge housing 16 and cartridge 30, to inlet/outlet port 15A.

Figure 9A:
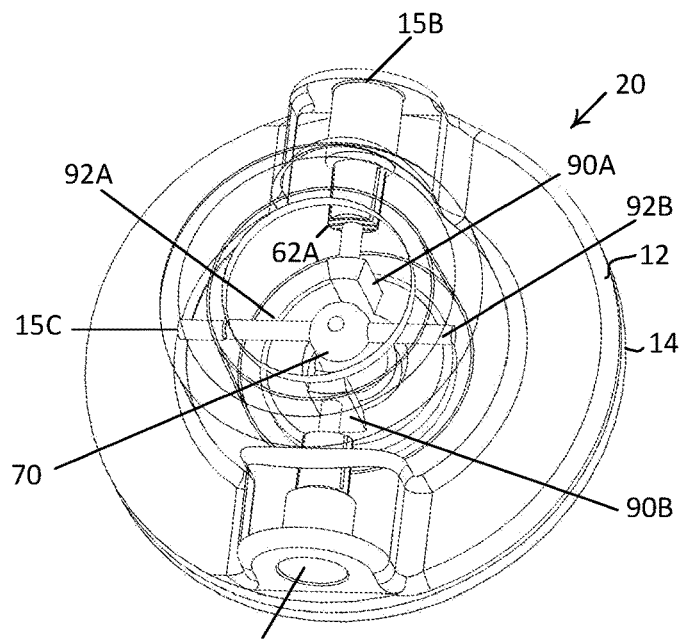
FIG. 9A is a first perspective view.
Figure 9B:
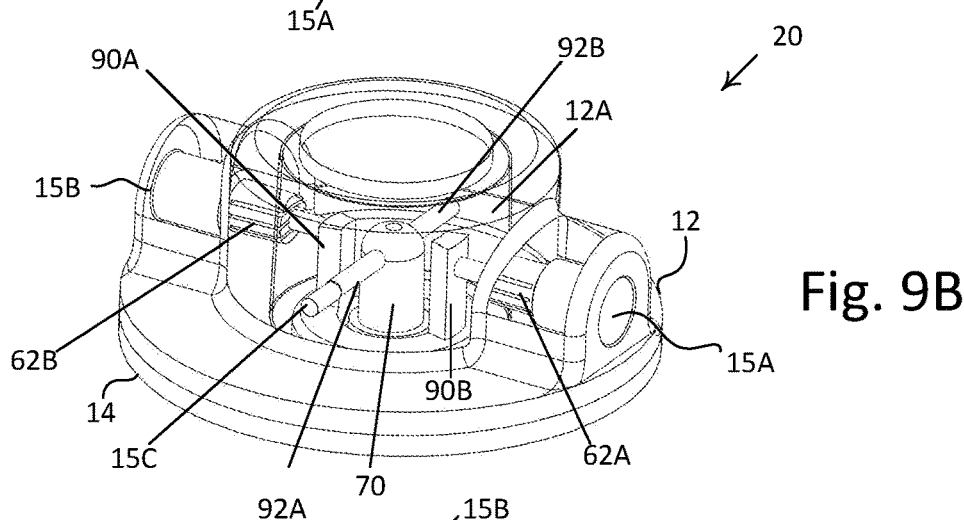
FIG. 9B is a second perspective view.
Figure 9C:
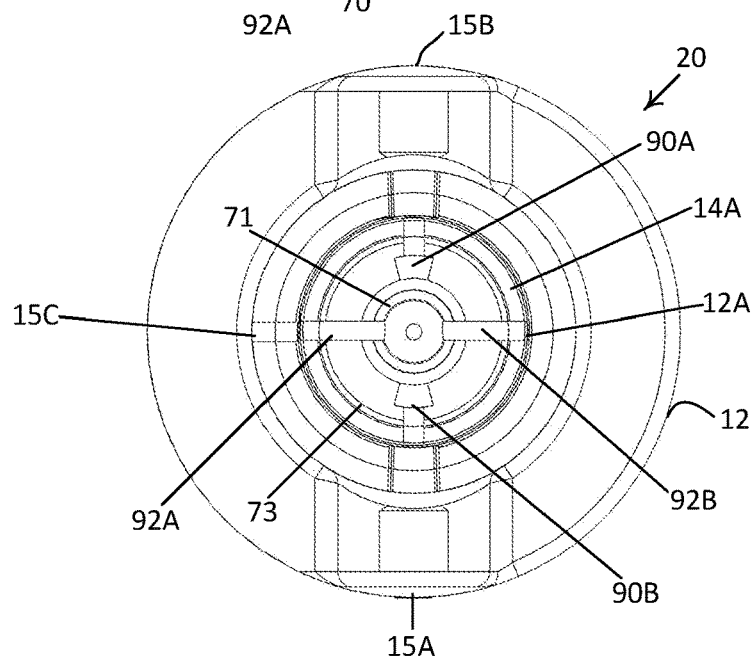
FIG. 9C is a top view, illustrating internal features of example water filtration system head 20 in a flush mode, in accordance with an embodiment of the disclosure.

FIG. 9A shows a first perspective view, FIG. 9B shows a second perspective view, and FIG. 9C shows a top view, illustrating internal features of example water filtration system head 20 in a flush mode, in accordance with an embodiment of the disclosure. The illustrated views again show a right-to-left flow configuration with reference to the directions in FIG. 1 and in the above description of the figures generally, as selected by the rotational position of rotatable valve body 14 with respect to frame 12. In the depicted configuration and mode, first water channel 70 extends from inner receptacle 71 to a flush outlet channel 92A having a terminal aperture aligns with the bore of flush port 15C. Flush inlet water channel 90A extends from the inside of outer receptacle 73 to inlet/outlet port 15B and another flush inlet water channel 90B extends from the inside of outer receptacle 73 to inlet/outlet port 15A. Thus, in either configuration of water filtration system 10, both inlet/outlet port 15A and inlet/outlet port 15B are coupled to the channel inside of outer receptacle 73, which is in fluid communication with the water volume between the outer wall of filter cartridge 30 and the inner wall of cartridge housing 16. Similarly, a flush outlet channel 92B extends in a direction opposite that of flush outlet channel 92A and will align with the bore of flush port 15C when rotatable valve body is oriented at 180 degrees from the depicted position. A separate view is not provided for flush mode in the left-to-right flow configuration, but due to provision of flush outlet channel 92B and both flush inlet channels 90A, 90B a second flush mode is provided with a 180 degree change in the rotation of rotatable valve body 14. In other embodiments, only flush inlet channel 90B may be included, as it is not necessary to couple the water outlet port for sourcing flush water.

Figure 10A:
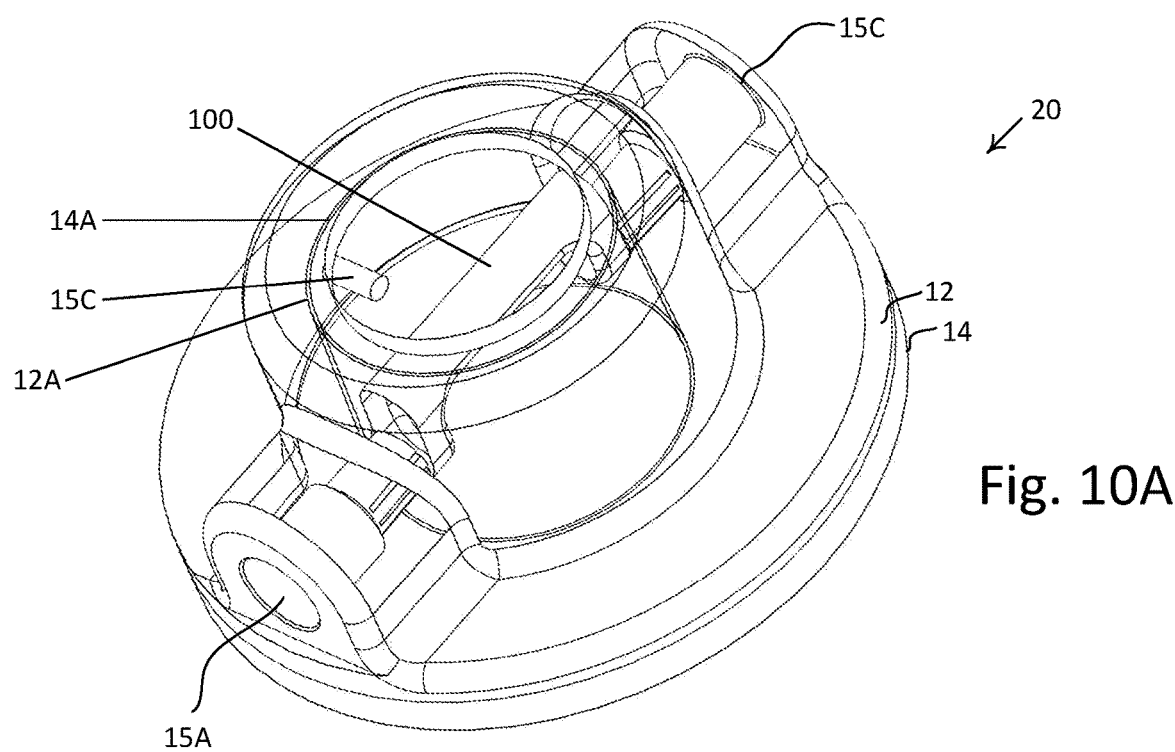
FIG. 10A is a perspective view.
Figure 10B:
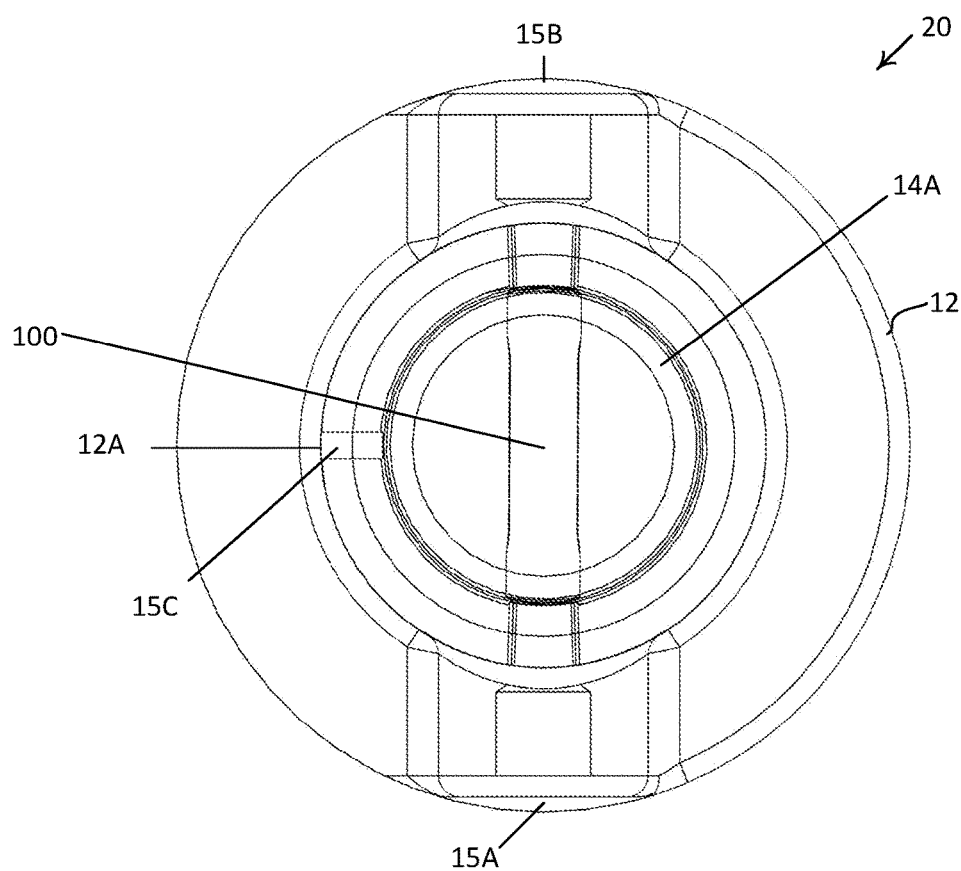
FIG. 10B is a top view, illustrating internal features of example water filtration system head 20 in a bypass mode, in accordance with an embodiment of the disclosure.

FIG. 10A shows a perspective view, and FIG. 10B shows a top view, illustrating internal features of example water filtration system head 20 in a bypass mode, in accordance with an embodiment of the disclosure. A bypass channel 100 couples inlet/outlet ports 15A and 15B, bypassing all of the water channels associated with cartridge 30 in the other operating modes. A separate view is not provided for right-to-left and left-to-right configurations of water filtration system 10, as the depicted bypass mode is symmetric with respect to a rotation of rotatable valve body 14 by 180 degrees.

In each of the configurations and modes described above, apertures terminating water channels on the face of cylindrical portion 14A of rotating valve body 14 abut apertures terminating water channels of frame 12 that connect to inlet/outlet ports 15A, 15B and flush port 15C. O-rings 45 are provided in grooves formed in the face of cylindrical portion 14A of rotating valve body 14, so that each selected operating mode for each configuration, the contact of the outer face of cylindrical portion 14A and the inner face of the void within frame 12 in which cylindrical portion 14A is seated, are sealed. Further sealing is provided by the O-rings 38B, 38C around cylindrical portion 14A. Apertures of cylindrical portion 14A along the inner face of the void within frame 12 are either coupled to a corresponding selected aperture of frame 12 or are blocked by the solid inside face of frame 12.

In summary, this disclosure shows and describes example water filtration systems and water filtration system heads. The water filtration systems may include a water filter cartridge defining an internal cylindrical void, a cartridge housing having an inner wall defining a substantially cylindrical void for receiving the water filter cartridge, so that the water filter cartridge has a longitudinal axis aligned with the central axis of the substantially cylindrical void of the cartridge housing, and a bottom wall supporting a bottom end of the water filter cartridge, and a water filtration system head having at least one first port accessible on an external surface of the water filtration system head for connection to an external plumbing water system and at least one second port accessible on the external surface of the water filtration system head for connection to the plumbing system. The water filtration system head may have a first fluid channel in fluid communication with a fluid volume disposed between the between an inner wall of the cartridge housing and an outer surface of the water filter cartridge, and a second fluid channel in fluid communication with the internal cylindrical void of the water filter cartridge. The water filtration system head may include a multi-position valve that in at least one first position, conducts inlet water from the at least one first port to the first fluid channel and conducts outlet water from the second fluid channel to the at least one second port, and that in at least one second position, conducts inlet water from the at least one second port to the first fluid channel and conducts outlet water from the second fluid channel to the at least one first port, whereby inlet and outlet connections to the external plumbing system are capable of interchange by adjusting the multi-position valve between the at least one first position and the at least one second position. The cartridge housing may have mounting features disposed at a top end of the cartridge housing for mating with corresponding mating features of the water filtration system head.

In some embodiments, the water filtration system head may further include a flush port accessible on the external surface of the water filtration system head for permitting exit of water with debris, wherein the at least one first position further includes a first flush position, wherein the at least one second position further includes a second flush position, wherein the multi-position valve, in the first flush position, conducts the inlet water from the at least one first port to the first fluid channel and conducts the outlet water from the second fluid channel to the first flush port, and wherein the multi-position valve, in the second flush position, conducts the inlet water from the at least one second port to the first fluid channel and conducts the outlet water from the second fluid channel to the flush port. In some embodiments, the at least one first position may further include a first bypass position, wherein the at least one second position further includes a second bypass position, wherein the multi-position valve, in the first bypass position and in the second bypass position, couples the at least one first port and the at least one second port in fluid communication.

In some embodiments, the water filtration system head may include a rotatable valve body having a mount disposed on a bottom side therefor for detachably securing the cartridge housing to the water filtration system head and that may have a cylindrical portion extending from a top side of the mount. The rotatable valve body may include the first fluid channel and the second fluid channel, a frame including the at least one first port, the at least one second port and the flush port. The frame may define an internal cavity for accepting the cylindrical portion of the rotatable valve body, and the internal cavity may extend through a top side of the frame, whereby the rotatable valve body and the frame form the multi-position valve. The rotatable valve may include a handle that may attach to a top end of the cylindrical portion of the rotatable valve body and secure the rotatable valve body within the frame. In some embodiments, the frame may include a stop that prevents rotation of the rotatable valve body in a first configuration of the rotatable handle, so that the multi-position valve can only be adjusted between the first position, the first flush position and the first bypass position, and wherein when the rotatable handle is configured in the second configuration, the multi-position valve can only be adjusted between the second position, the second flush position and the second bypass position, wherein the first configuration and the second configuration are configured by attachment of the handle to the rotatable valve body in different rotational relationships between the handle and the rotatable valve body.

In some embodiments, the rotatable valve body may include a first valve channel commencing on a first aperture disposed on a curved face of the cylindrical portion and terminating on a second aperture disposed at a bottom side of the valve body and in fluid communication with the fluid volume disposed between the between an inner wall of the housing and an outer surface of the water filter cartridge, and a second valve channel commencing on a third aperture disposed on a curved face of the cylindrical portion and terminating on a fourth aperture disposed at the bottom side of the valve body and in fluid communication with the internal cylindrical void of the water filter cartridge. The internal cavity of the frame may have a fifth aperture in fluid communication with the at least one first port and that abuts the first aperture of the first valve channel when the multi-position valve is in the first position and that abuts the third aperture of the first valve channel when the multi-position valve is in the second position. The internal cavity may have a sixth aperture in fluid communication with the at least one second port and that may abut the third aperture of the second valve channel when the multi-position valve is in the first position and that may abut the fourth aperture of the second valve channel when the multi-position valve is in the second position.

In some embodiments, the cylindrical portion of the valve body may have a bypass channel terminating on apertures disposed on opposite sides of the curved face of the cylindrical portion, and each of the apertures may be aligned with one of the fifth aperture and the sixth aperture when the multi-position valve is in the first bypass position or the second bypass position.

In some embodiments, the cylindrical portion of the valve body may have a first flush channel having a seventh aperture disposed on the curved face of the cylindrical portion of the valve body and a second flush channel having an eighth aperture disposed on the curved face of the curved face of the cylindrical portion of the valve body, wherein the internal cavity of the water filtration head has a ninth aperture in fluid communication with the flush port. The seventh aperture may abut the ninth aperture when the multi-position valve is in the first flush position and the eighth aperture may abut the ninth aperture when the multi-position valve is in the second flush position. The first flush channel and the second flush channel may terminate at the bottom side of the valve body, and both of the first flush channels may be in fluid communication with the central void of the water filter cartridge. The cylindrical portion of the valve body may have a flush supply channel that extends between a first flush supply aperture and a second flush supply aperture disposed on the curved face of the curved face of the cylindrical portion of the valve body. The first flush supply aperture may abut the fifth aperture when the multi-position valve is in the first flush position, and the second flush supply aperture may abut the sixth aperture when the multi-position valve is in the second flush position.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to filtering systems other than water filtration systems.

What is claimed is:

1. A water filtration system, comprising:
   a water filter cartridge defining an internal cylindrical void;
   a cartridge housing having an inner wall defining a substantially cylindrical void for receiving the water filter cartridge, so that the water filter cartridge has a longitudinal axis aligned with the central axis of the substantially cylindrical void of the cartridge housing, and a bottom wall supporting a bottom end of the water filter cartridge; and
   a water filtration system head having at least one first port accessible on an external surface of the water filtration system head for connection to an external plumbing water system and at least one second port accessible on the external surface of the water filtration system head for connection to the plumbing system, wherein the water filtration system head has a first fluid channel in fluid communication with a fluid volume disposed between the between an inner wall of the cartridge housing and an outer surface of the water filter cartridge, and having a second fluid channel in fluid communication with an internal cylindrical void of the water filter cartridge, wherein the water filtration system head includes a rotatable multi-position valve that in at least one first position, conducts inlet water from the at least one first port to the first fluid channel and conducts outlet water from the second fluid channel to the at least one second port, and that in at least one second position, conducts inlet water from the at least one second port to the first fluid channel and conducts outlet water from the second fluid channel to the at least one first port, whereby inlet and outlet connections to the external plumbing system are capable of interchange by rotating the multi-position valve between the at least one first position and the at least one second position, and wherein the cartridge housing has mounting features disposed at a top end of the cartridge housing for mating with corresponding mating features of the water filtration system head.

2. The water filtration system of claim 1, wherein the water filtration system head further includes a flush port accessible on the external surface of the water filtration system head for permitting exit of water with debris, wherein the at least one first position further includes a first flush position, wherein the at least one second position further includes a second flush position, wherein the multi-position valve, in the first flush position, conducts the inlet water from the at least one first port to the first fluid channel and conducts the outlet water from the second fluid channel to the first flush port, and wherein the multi-position valve, in the second flush position, conducts the inlet water from the at least one second port to the first fluid channel and conducts the outlet water from the second fluid channel to the flush port.

3. The water filtration system of claim 2, wherein the at least one first position further includes a first bypass position, wherein the at least one second position further includes a second bypass position, wherein the multi-position valve, in the first bypass position and in the second bypass position, couples the at least one first port and the at least one second port in fluid communication, to bypass the water filter cartridge.

4. The water filtration system of claim 3, wherein the water filtration system head comprises:
   a rotatable valve body having a mount disposed on a bottom side therefor for detachably securing the cartridge housing to the water filtration system head and having a cylindrical portion extending from a top side of the mount, wherein the rotatable valve body includes the first fluid channel and the second fluid channel;
   a frame including the at least one first port, the at least one second port and the flush port, wherein the frame defines an internal cavity for accepting the cylindrical portion of the rotatable valve body, wherein the internal cavity extends through a top side of the frame, whereby the rotatable valve body and the frame form the multi-position valve: and
   a rotatable handle that attaches to a top end of the cylindrical portion of the rotatable valve body and secures the rotatable valve body within the frame.

5. The water filtration system of claim 4, wherein the frame includes a stop that prevents rotation of the rotatable valve body in a first configuration of the rotatable handle, so that the multi-position valve can only be adjusted between the first position, the first flush position and the first bypass position, and wherein when the rotatable handle is configured in a second configuration, the multi-position valve can only be adjusted between the second position, the second flush position and the second bypass position, wherein the first configuration and the second configuration are configured by attachment of the handle to the rotatable valve body in different rotational relationships between the handle and the rotatable valve body.

6. The water filtration system of claim 5, wherein the rotatable valve body includes a first valve channel commencing on a first aperture disposed on a curved face of the cylindrical portion and terminating on a second aperture disposed at a bottom side of the valve body and in fluid communication with the fluid volume disposed between the between an inner wall of the housing and an outer surface of the water filter cartridge, and a second valve channel commencing on a third aperture disposed on a curved face of the cylindrical portion and terminating on a fourth aperture disposed at the bottom side of the valve body and in fluid communication with the internal cylindrical void of the water filter cartridge, wherein the internal cavity of the frame has a fifth aperture in fluid communication with the at least one first port and that abuts the first aperture of the first valve channel when the multi-position valve is in the first position and that abuts the third aperture of the first valve channel when the multi-position valve is in the second position, wherein the internal cavity has a sixth aperture in fluid communication with the at least one second port and that abuts the third aperture of the second valve channel when the multi-position valve is in the first position and that abuts the fourth aperture of the second valve channel when the multi-position valve is in the second position.

7. The water filtration system of claim 6, wherein the cylindrical portion of the valve body has a bypass channel terminating on apertures disposed on opposite sides of the curved face of the cylindrical portion, wherein each of the apertures are aligned with one of the fifth aperture and the sixth aperture, when the multi-position valve is in the first bypass position or the second bypass position.

8. The water filtration system of claim 6, wherein the cylindrical portion of the valve body has a first flush channel having a seventh aperture disposed on the curved face of the cylindrical portion of the valve body and a second flush channel having an eighth aperture disposed on the curved face of the curved face of the cylindrical portion of the valve body, wherein the internal cavity of the water filtration head has a ninth aperture in fluid communication with the flush port, wherein the seventh aperture abuts the ninth aperture when the multi-position valve is in the first flush position and wherein the eighth aperture abuts the ninth aperture when the multi-position valve is in the second flush position, wherein both of the first flush channel and the second flush channel terminate at the bottom side of the valve body, wherein both of the first flush channels are in fluid communication with the internal cylindrical void of the water filter cartridge, and wherein the cylindrical portion of the valve body has a flush supply channel that extends from a first flush supply aperture and a second flush supply aperture disposed on the curved face of the curved face of the cylindrical portion of the valve body, wherein the first flush supply aperture abuts the fifth aperture when the multi-position valve is in the first flush position, and wherein the second flush supply aperture abuts the sixth aperture when the multi-position valve is in the second flush position.

9. The water filtration system of claim 1, wherein the water filtration system head comprises:
   a rotatable valve body having a mount disposed on a bottom side therefor for detachably securing the cartridge housing to the water filtration system head and having a cylindrical portion extending from a top side of the mount, wherein the rotatable valve body includes the first fluid channel and the second fluid channel;
   a frame including the at least one first port and the at least one second port, wherein the frame defines an internal cavity for accepting the cylindrical portion of the rotatable valve body, wherein the internal cavity extends through a top side of the frame, whereby the rotatable valve body and the frame form the multi-position valve; and
   a rotatable handle that attaches to a top end of the cylindrical portion of the rotatable valve body and secures the rotatable valve body within the frame.

10. The water filtration system of claim 9, wherein the rotatable valve body includes a first valve channel commencing on a first aperture disposed on a curved face of the cylindrical portion and terminating on a second aperture disposed at a bottom side of the valve body and in fluid communication with the fluid volume disposed between the between an inner wall of the housing and an outer surface of the water filter cartridge, and a second valve channel commencing on a third aperture disposed on a curved face of the cylindrical portion and terminating on a fourth aperture disposed at the bottom side of the valve body and in fluid communication with the internal cylindrical void of the water filter cartridge, wherein the internal cavity of the frame has a fifth aperture in fluid communication with the at least one first port and that abuts the first aperture of the first valve channel when the multi-position valve is in the first position and that abuts the third aperture of the first valve channel when the multi-position valve is in the second position, wherein the internal cavity has a sixth aperture in fluid communication with the at least one second port and that abuts the third aperture of the second valve channel when the multi-position valve is in the first position and that abuts the fourth aperture of the second valve channel when the multi-position valve is in the second position.

11. A water filtration system head for attachment of a water filter cartridge and cartridge housing, the water filtration system head comprising:
a rotatable valve body having a mount disposed on a bottom side thereof for detachably securing the cartridge housing to the water filtration system head and having a cylindrical portion extending from a top side of the mount, wherein the rotatable valve body includes a first fluid channel terminating on a lower internal face of the rotatable valve body and proximate a periphery of the rotatable valve body to provide fluid communication with a fluid volume disposed between an inner wall of the housing and an outer surface of a water filter cartridge when the housing is attached to the water filtration system head and the water filter cartridge is enclosed by the water filtration system head and the housing, and wherein the rotatable valve body includes a second fluid channel terminating on a central portion of the lower internal face of the rotatable valve body to provide fluid communication with an internal cylindrical void of the water filter cartridge;
a frame including at least one first port for connection to an external plumbing system, at least one second port for connection to the external plumbing system, wherein the frame defines an internal cavity for accepting the cylindrical portion of the rotatable valve body, wherein the internal cavity extends through a top side of the frame, whereby the rotatable valve body and the frame form a multi-position valve that in at least one first position, conducts inlet water from the at least one first port to the first fluid channel and conducts outlet water from the second fluid channel to the at least one second port, and that in at least one second position, conducts inlet water from the at least one second port to the first fluid channel and conducts outlet water from the second fluid channel to the at least one first port, whereby inlet and outlet connections to the external plumbing system are capable of interchange by adjusting the multi-position valve between the at least one first position and the at least one second position; and
a rotatable handle that attaches to a top end of the cylindrical portion of the rotatable valve body and secures the rotatable valve body within the frame.

12. The water filtration system head of claim 11, wherein the frame further comprises a flush port accessible on the external surface of the frame for permitting exit of water with debris, wherein the at least one first position further includes a first flush position, wherein the at least one second position further includes a second flush position, wherein the multi-position valve, in the first flush position, conducts the inlet water from the at least one first port to the first fluid channel and conducts the outlet water from the second fluid channel to the first flush port, and wherein the multi-position valve, in the second flush position, conducts the inlet water from the at least one second port to the first fluid channel and conducts the outlet water from the second fluid channel to the flush port.

13. The water filtration system head of claim 11, wherein the at least one first position further includes a first bypass position, wherein the at least one second position further includes a second bypass position, wherein the multi-position valve, in the first bypass position and in the second bypass position, couples the at least one first port and the at least one second port in fluid communication, to bypass the water filter cartridge.

14. A method of directing water flow through a water filter system head, comprising:
providing inlet water at a selected one of at least one first port or at least one second port accessible at an outer surface of the water filter system head;
filtering the inlet water with a cylindrical water filter cartridge by passing the inlet water from an outer surface of the cylindrical water filter cartridge through the cylindrical water filter cartridge to an inner central void of the cylindrical water filter cartridge;
receiving filtered outlet water from the inner central void of the cylindrical water filter cartridge at another one of the at least one first port or the at least one second port of the water filter system head;
directing the water flow by selecting the at least one first port or the at least one second port by rotating a multi-position valve of the water filter system head that, in a first configuration, receives the inlet water from the at least one first port and directs outlet water to the at least one second port, and that in a second configuration, receives the inlet water from the at least one second port and directs outlet water to the at least one first port.

15. The method of claim 14, further comprising:
adjusting the multi-position valve to at least one flush position; and
responsive to adjusting the multi-position valve to the flush position, ejecting water with debris from a flush port accessible on the external surface of the water filter system head, by directing the inlet water to the inner central void of the cylindrical water filter cartridge and delivering water from the outer surface of the cylindrical water filter cartridge to the flush port.

16. The method of claim 14, further comprising:
adjusting the multi-position valve to at least one bypass position; and
responsive to adjusting the multi-position valve to the bypass position, coupling the at least one first port to the at least one second port to bypass the cylindrical water filter cartridge.

17. The method of claim 14, further comprising:
attaching a cartridge housing containing the cylindrical water filter cartridge to a mount disposed on a bottom side of a rotatable valve body of the water filter system head having a cylindrical portion extending from a top side of the mount; and
inserting the cylindrical portion of the rotatable valve body into an internal cavity of a frame of the water filter system head that includes the at least one first port and the at least one second port, wherein the multi-position valve is provided by the combined rotatable valve body and the frame of the water filter system head.

18. The method of claim 17, further comprising securing the rotatable valve body to the frame with a rotatable handle that attaches to a top end of the cylindrical portion of the rotatable valve body and secures the rotatable valve body within the frame.

19. The method of claim 18, further comprising restriction adjustment of the multi-position valve with a stop that prevents rotation of the rotatable valve body in a first configuration of the rotatable handle, so that the multi-position valve can only be adjusted between a first normal operating position, a first flush position and a first bypass position in the first configuration of the multi-position valve and that the multi-position valve can only be adjusted between a second normal operating position, a second flush position and a second bypass position in the second configuration of the multi-position valve.

20. The method of claim 18, wherein the rotating of the multi-position valve comprises:
- selecting the first configuration by attaching the rotatable handle to the rotatable valve body in a first rotational position of the rotatable handle with respect to the rotatable valve body; and
- selecting the second configuration by attaching the rotatable handle to the rotatable valve body in a second rotational position of the rotatable handle with respect to the rotatable valve body.

* * * * *